United States Patent [19]

Jaskie et al.

[11] Patent Number: 5,141,460
[45] Date of Patent: Aug. 25, 1992

[54] METHOD OF MAKING A FIELD EMISSION ELECTRON SOURCE EMPLOYING A DIAMOND COATING

[76] Inventors: James E. Jaskie, 12256 E. Mountain View, Scottsdale, Ariz. 85259; Robert C. Kane, 15412 St. Patrick Rd., Woodstock, Ill. 60098

[21] Appl. No.: 747,563

[22] Filed: Aug. 20, 1991

[51] Int. Cl.⁵ .............................................. H01J 9/02
[52] U.S. Cl. ........................................ 445/24; 445/50; 445/58; 313/309
[58] Field of Search .......................... 445/24, 50, 58; 313/309, 336, 355

[56] References Cited

U.S. PATENT DOCUMENTS

| | | | |
|---|---|---|---|
| 4,008,412 | 2/1977 | Yuito et al. | 313/309 |
| 4,164,680 | 8/1979 | Villalobos | 313/336 |
| 4,277,293 | 7/1981 | Nelson et al. | 437/9 |
| 4,307,507 | 12/1981 | Gray et al. | 445/50 X |
| 5,074,456 | 12/1991 | Degner et al. | 228/121 |

Primary Examiner—Kenneth J. Ramsey
Attorney, Agent, or Firm—Eugene A. Parsons

[57] ABSTRACT

A field emission electron device employing an electron emitter comprised of a coating of diamond material disposed on a surface of a selectively formed conductive/semiconductive electrode and a method of forming the device including a step wherein carbon ions are implanted at a surface of a conductive/semiconductive electrode to function as nucleation sites for the diamond formation.

16 Claims, 7 Drawing Sheets

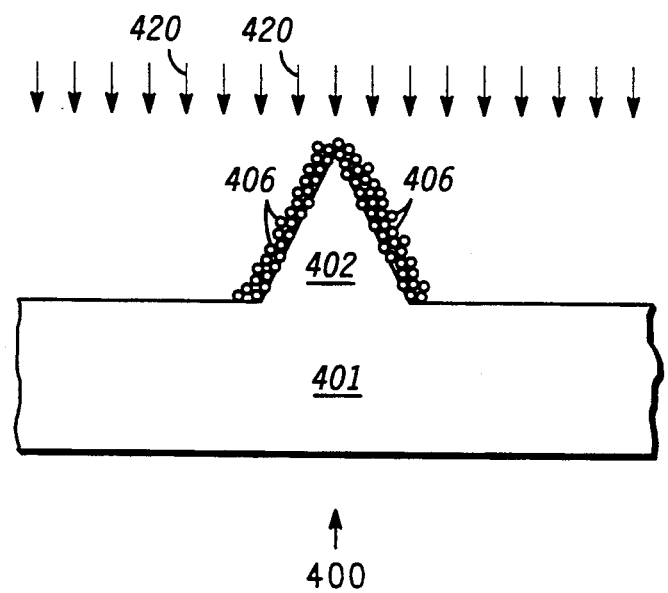
FIG. 4C
FIG. 5A
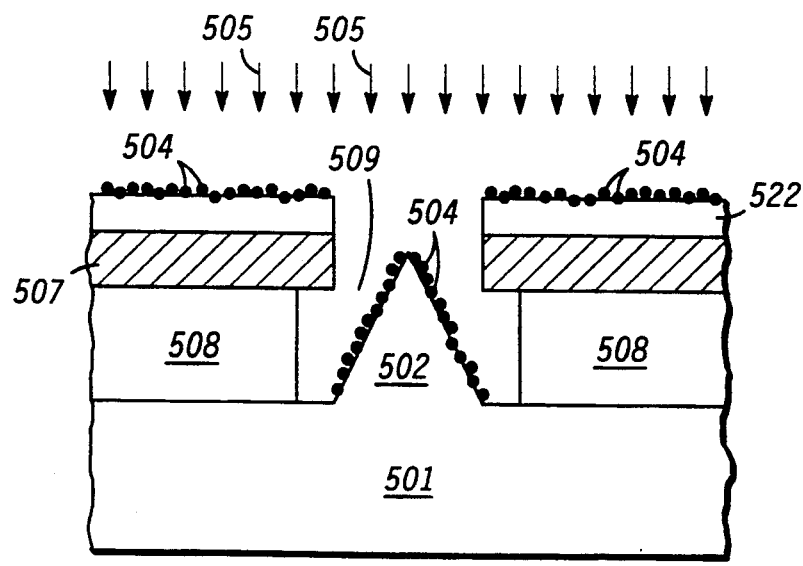

METHOD OF MAKING A FIELD EMISSION ELECTRON SOURCE EMPLOYING A DIAMOND COATING

FIELD OF THE INVENTION

The present invention relates generally to field emission electron devices and more particularly to field emission electron devices and methods of producing field emission electron devices employing low/negative electron affinity coatings.

BACKGROUND OF THE INVENTION

Field emission devices employing preferentially shaped conductive/semiconductive electrodes as electron emitters are known in the art. The prior art electron emitters are known to exhibit undesirable characteristics such as high operating voltages, surface instability, and susceptibility to ion bombardment damage.

Accordingly there exists a need for electron devices employing an electron emitter electron source which overcomes at least some of the shortcomings of the electron sources of the prior art.

SUMMARY OF THE INVENTION

This need and others are substantially met through provision of a method for forming a field emission electron emitter including the steps of providing a selectively shaped conductive/semiconductive electrode having a major surface, implanting ions, as nucleation sites, onto at least a part of the major surface of the conductive/semiconductive electrode, and growing diamond crystallites preferentially at at least some of the nucleation sites, such that an electron emitter comprising a coating of diamond disposed on at least a part of the major surface of the selectively shaped conductive/semiconductive electrode is formed.

This need and others are further met through provision of a field emission electron device including a field emission electron emitter with a selectively formed conductive/semiconductive electrode having a major surface, a plurality of ion implanted nucleation sites disposed on the major surface of the conductive/semiconductive electrode, and at least a first diamond crystallite disposed on the major surface of the conductive/semiconductive electrode and at a nucleation site of the plurality of nucleation sites; an emission controlling electrode proximally disposed with respect to the electron emitter for controlling the emission rate of electrons from the electron emitter; and an anode for collecting emitted electrons.

BRIEF DESCRIPTION OF THE DRAWINGS

FIGS. 4A–4C are side elevational depictions of structures which are realized by performing various steps of a method in accordance with the present invention.

FIGS. 5A–5D are side elevational depictions of structures which are realized by performing various steps of another method in accordance with the present invention.

DETAILED DESCRIPTION OF THE PREFERRED EMBODIMENTS

Figure 1:
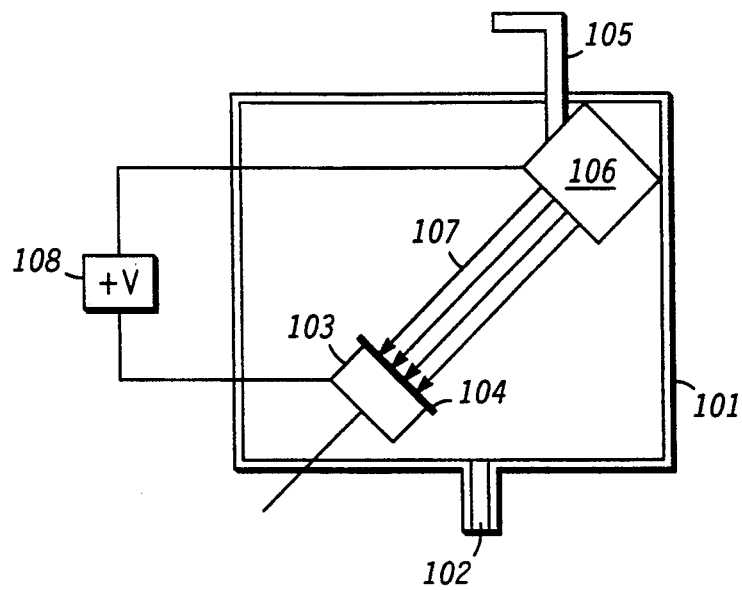
FIG. 1 is a schematic representation of ion implantation apparatus.

Referring now to FIG. 1 there is shown a representative schematical depiction of one embodiment of ion implantation apparatus. An evacuated enclosure 101 is provided wherein an ion source 106 and a substrate (target) holding fixture 103 are disposed. An ion material source aperture 105 is provided, as shown, to supply the ion source 106 with material. An evacuation port 102 is provided to which an evacuating device, not shown, may be operably coupled to evacuate enclosure 101. During operation of the implantation apparatus an ion beam 107 is directed to a target 104, due to an electric field which is induced by a voltage source 108, such that at least some of the ions which comprise the ion beam 107 are implanted in/on target 104.

Figure 2:
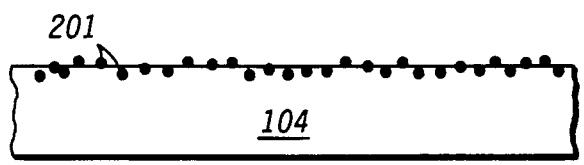
FIG. 2 is a cross sectional depiction of ion implantation.

FIG. 2 is a side elevational depiction of target (substrate) 104 whereon/wherein ions 201 have been implanted. Ions are selectively implanted to a desired depth in the material of target 104 depending on the strength of the associated accelerating electric field (not shown). Correspondingly, the electric field strength may be selected so that implanted ions will be substantially disposed at/on the surface of target 104.

Figure 3:
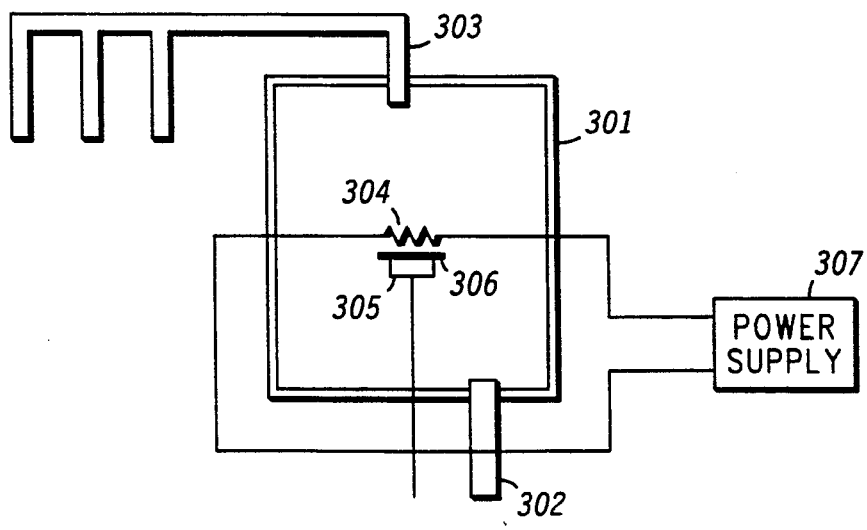
FIG. 3 is a schematic representation of diamond growing environment apparatus.

FIG. 3 is a representative schematical depiction of one embodiment of diamond growing environment apparatus. An evacuated enclosure 301 is provided wherein a substrate (target) holder 305 and a heating element 304 are disposed. A source tube 303, which is a part of a gas supply manifold, provides a source of reactive gas constituents into the diamond growing environment. Enclosure 301 is suitably evacuated by operably coupling an evacuation pump (not shown) to an evacuation port 302. During operation a substrate 306 is disposed on substrate holder 305 to which heating element 304 is also proximally disposed. Power source 307 provides electrical current through heating element 304 to heat substrate 306 and in the presence of appropriate gas constituents a reaction occurs at the surface of substrate 306 during which diamond is grown.

Diamond growth is at least partially dependent on an ability to nucleate at the surface of a material. In many methods of diamond formation the nucleation is random and not well distributed giving rise to undesirable and incomplete film growth. Carbon ions implanted at/on a surface of substrate 306 provides a substantially uniformly distributed plurality of nucleation sites from which diamond growth is initiated.

Figure 4A:
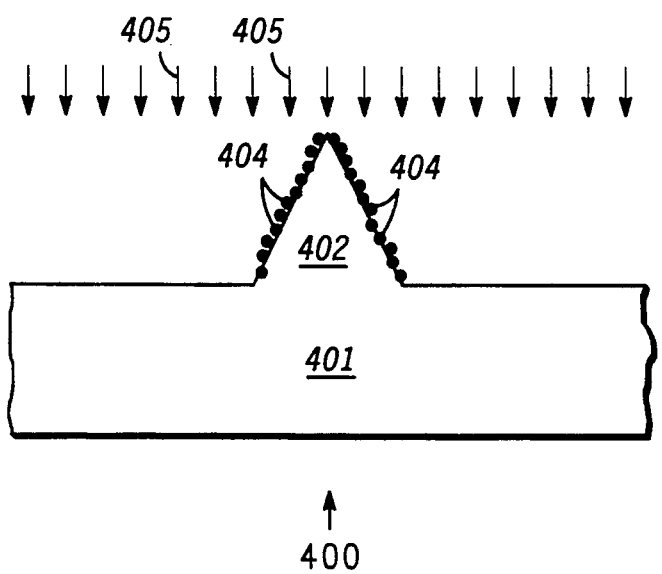

Referring now to FIG. 4A there is shown a side elevational depiction of a structure 400 which is realized by performing various steps in accordance with a method of the present invention. Structure 400 includes a selectively shaped layer 401 of conductive/semiconductive material, having at least a major surface, with the selective shaping, in this specific embodiment, being a generally conically shaped protrusion forming an electrode 402. Layer 401 is selectively shaped by any of many known techniques including, but not limited to, anisotropic etching and ion milling. A carbon ion beam, depicted by arrows 405, provides for implantation of carbon nucleation sites 404 at the major surface of electrode 402.

Figure 4B:
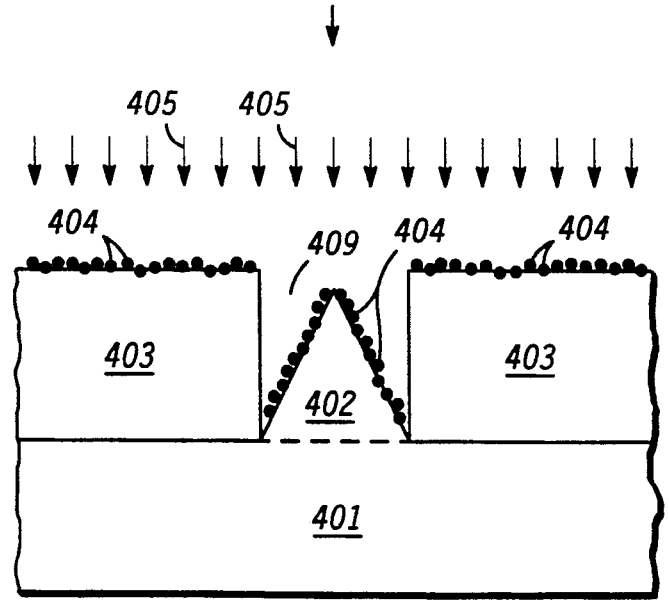

Alternatively, and with reference to FIG. 4B, layer 401 is a supporting substrate which is provided with a layer 403 of patternable material, such as photoresist or insulator material, having at least one aperture 409 therethrough. Aperture 409 is selectively formed by preferentially patterning and developing photoresist or by preferentially etching insulator material as may be required. A conductive/semiconductive electrode 402 is substantially disposed within aperture 409 and on the layer 401. A carbon ion beam, depicted by arrows 405, provides for implantation of nucleation sites 404 at the conductive/semiconductive electrode 402, with the remainder of layer 401 being protected from implantation of nucleation sites 404 by layer 403. The layer of patternable material 403 may be removed subsequent to the implantation of nucleation sites 404.

FIG. 4C is a side elevational depiction of structure 400 as described previously with reference to FIGS. 4A and 4B and having undergone additional steps of the method in accordance with the present invention. A source of reactant material, depicted by arrows 420, disposed in an intervening region between conductive/semiconductive electrode 402 and a proximal heating element (element 304 described previously with reference to FIG. 3) gives rise to growth of diamond crystallite 406 preferentially at the implanted carbon nucleation sites.

The resultant conductive/semiconductive electrode 402 on which is disposed a coating of diamond crystallite 406 comprises a field emission electron emitter exhibiting a number of desirable operating characteristics including reduced voltage operation, improved surface stability, and reduced susceptibility to ion bombardment damage. Incorporation of implanted carbon nucleation sites 404 provides a mechanism for improved diamond crystallite coverage and discourages the formation of a non-uniform coating which may include undesirably large crystallite growth.

FIG. 5A is a side elevational depiction of a structure 500 which is realized by performing steps of another method in accordance with the present invention. A supporting substrate 501 is provided. A layer 508 of insulator material having an aperture 509 formed therethrough is disposed on supporting substrate 501. A conductive/semiconductive electrode 502, formed as described previously with reference to FIGS. 4A and 4B, is disposed within aperture 509 and on supporting substrate 501. A layer 507 of conductive/semiconductive material is disposed on layer 508 substantially conformally with respect to aperture 509 such that aperture 509 is further defined through layer 507. A layer 522 of patternable material is deposited on layer 507. A carbon ion beam, depicted by arrows 505, provides for implantation of nucleation sites 504 at conductive/semiconductive electrode 502. Layer 522 may be removed subsequent to the implantation of the nucleation sites 504.

Figure 5B:
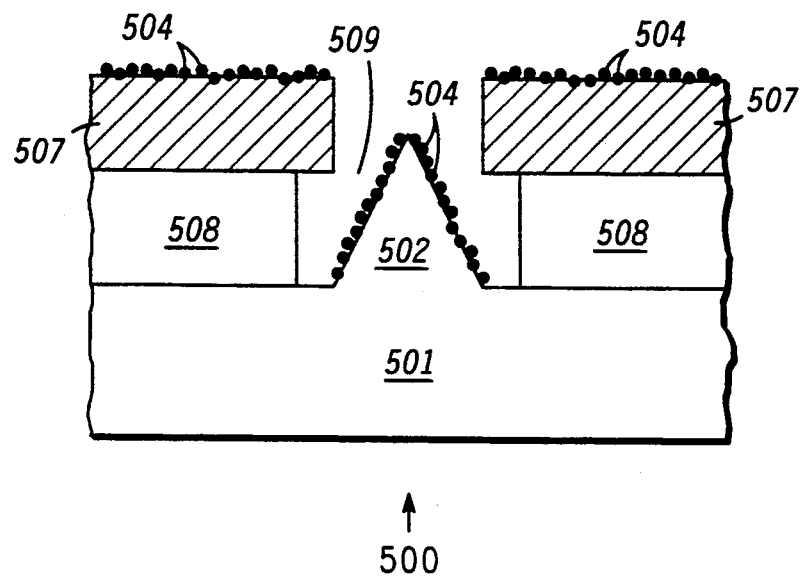

Alternatively, and with reference to FIG. 5B, patternable layer 522 described in FIG. 5A is omitted with the result that at least some nucleation sites 504 are deposited on the conductive/semiconductive layer 507.

Figure 5C:
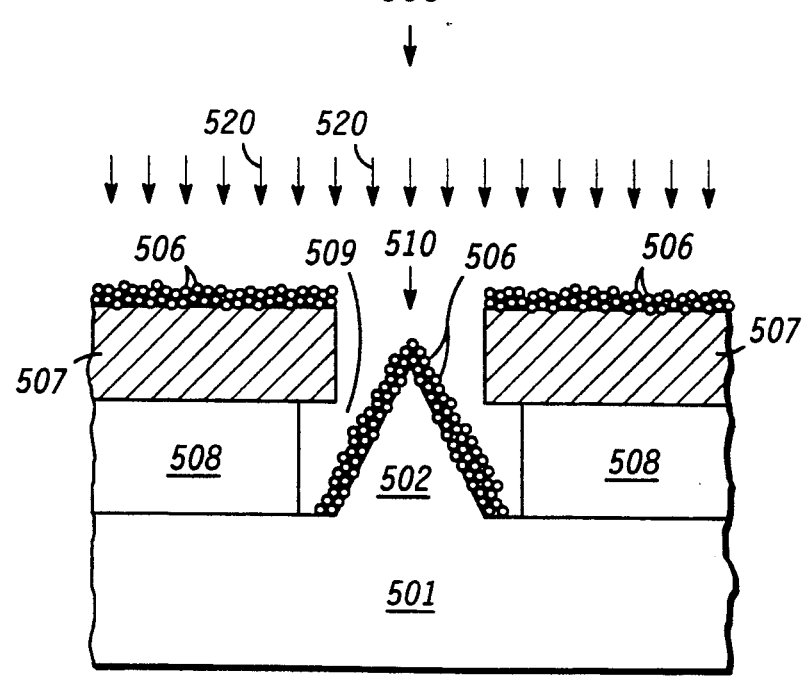

FIG. 5C is a side elevational depiction of structure 500 as described previously with reference to FIGS. 5A and 5B and having undergone additional steps of the method. A source of reactant material, depicted by arrows 520, disposed in an intervening region between conductive/semiconductive electrode 502 and a proximal heating element (see FIG. 3), gives rise to growth of diamond crystallite 506 preferentially at the implanted carbon nucleation sites. The combination of conductive/semiconductive electrode 502 with a coating of diamond nucleation sites 506 produces an improved electron emitter 510.

Figure 5D:
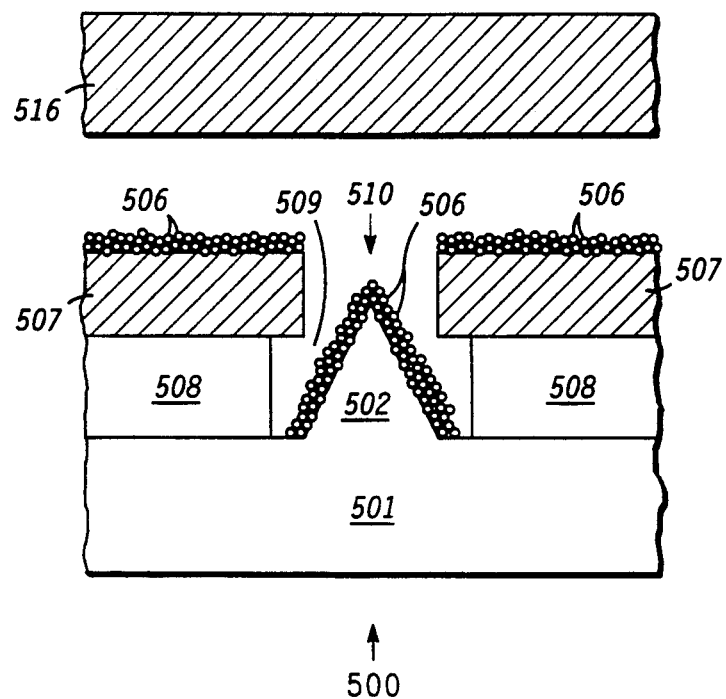

FIG. 5D is a side elevational depiction of structure 500 described previously with reference to FIG. 5C and further comprising an anode 516, distally disposed with respect to electron emitter 510, for collecting any electrons which are emitted by electron emitter 510. Layer 507, since it is formed of conductive/semiconductive material, functions as an emission controlling electrode for controlling the rate of electrode emission. A field emission device (structure 500) employing an electron emitter comprised of a diamond coating, formed in accordance with the method of the present invention described in FIG. 5D, may be employed advantageously in applications known in the art. Utilizing implanted nucleation sites from which diamond crystallite growth may be initiated provides for a more uniform coating. Since coating thicknesses on the order of 10 Å to less than 5000 Å are desirable it is an important feature of coating formation that irregularities in coating thickness and coverage be minimized. Other methods of realizing diamond film growth do not provide for substantially uniform growth thickness and coverage.

Figure 6A:
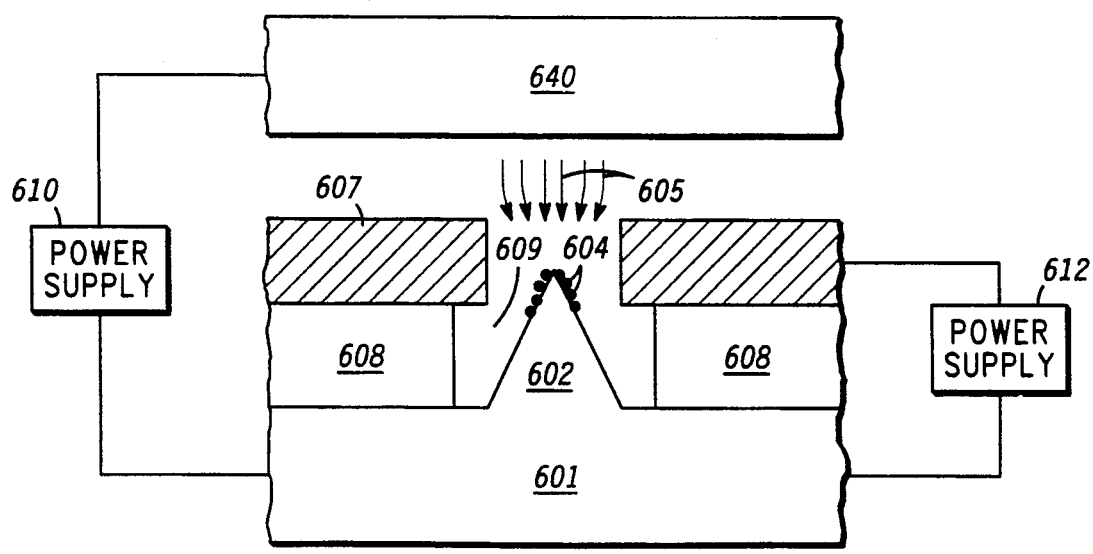
FIGS. 6A–6E are side elevational representations of structures which are realized by performing various steps of yet another method in accordance with the present invention.

FIG. 6A is a side elevational depiction of a structure 600, similar to that described previously with reference to FIG. 5B, wherein similar features initially described in FIG. 5B are similarly referenced beginning with the numeral "6". FIG. 6A further depicts that an ion implantation source 640 provides an ion beam 605 from which carbon nucleation sites 604 are implanted on the conductive/semiconductive electrode 602. In the instance of FIG. 6A, an externally provided voltage source 610 is operably coupled between ion implantation source 640 and supporting substrate 601. A second externally provided voltage source 612 is operably coupled between conductive/semiconductive layer 607 and supporting substrate 601. Alternatively, the structure of FIG. 6A may employ a conductive/semiconductive electrode formed as described previously with reference to FIG. 4A. By applying a suitable voltage to conductive/semiconductive layer 607, ions which comprise the ion beam 605 are preferentially repelled from the region proximal to the periphery of conductive/semiconductor layer 607 and correspondingly toward a preferred small part of the surface of conductive/semiconductive electrode 602. This redirection of ion beam 605 results in implantation of nucleation sites 604 substantially at only a preferred part of the surface of conductive/semiconductive electrode 602.

Figure 6B:
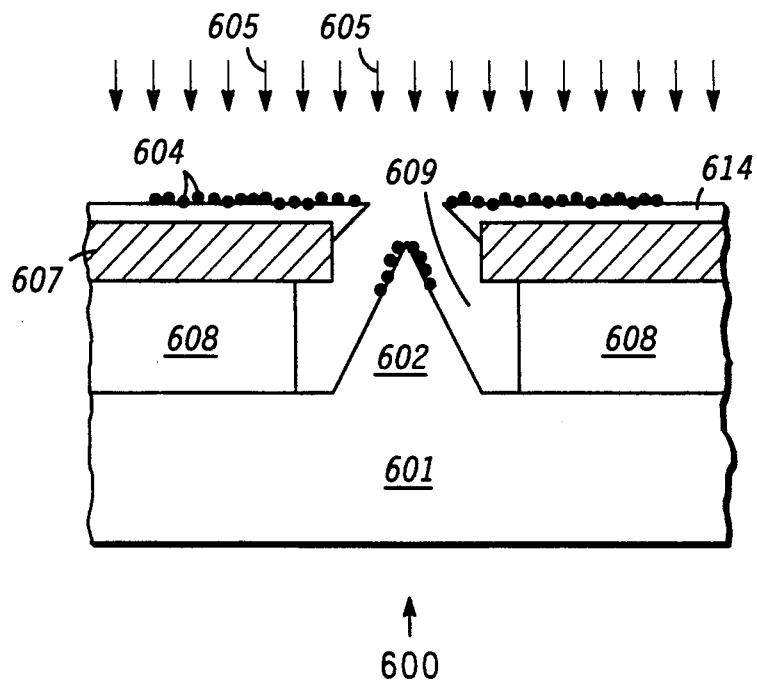

FIG. 6B is a side elevational view of structure 600 wherein a different feature is utilized to obtain the results described in FIG. 6A. In this modified method aperture 609 is partially closed by employing a low angle material deposition, as is known in the art, to provide a partial closure layer 614. A carbon ion beam, depicted by arrows 605, provides for implantation of nucleation sites 604 at conductive/semiconductive electrode 602.

Figure 6C:
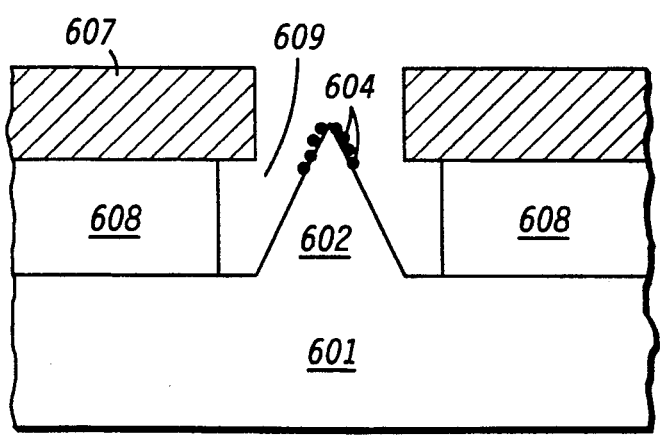

FIG. 6C depicts structure 600 after having undergone an additional process step wherein closure layer 614 is removed.

Figure 6D:
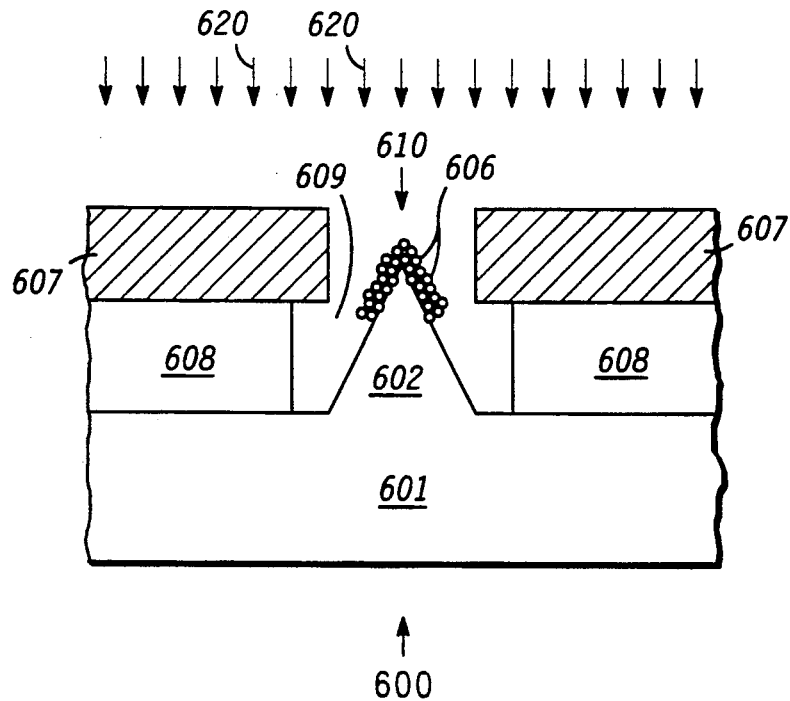

FIG. 6D is a side elevational depiction of structure 600 having undergone additional steps of the method wherein a source of reactant material, depicted by arrows 620, disposed in an intervening region between conductive/semiconductive electrode 602 and a proximal heating element (see FIG. 3), gives rise to growth of diamond crystallite 606 preferentially at the implanted carbon nucleation sites. In the instance of the structure of FIG. 6D the diamond crystallite growth takes place preferentially on only a part of the exposed part of conductive/semiconductive electrode 602. The combination of conductive semiconductive electrode 602 with the coating diamond crystallite 606 forms an improved electron emitter 610.

Figure 6E:
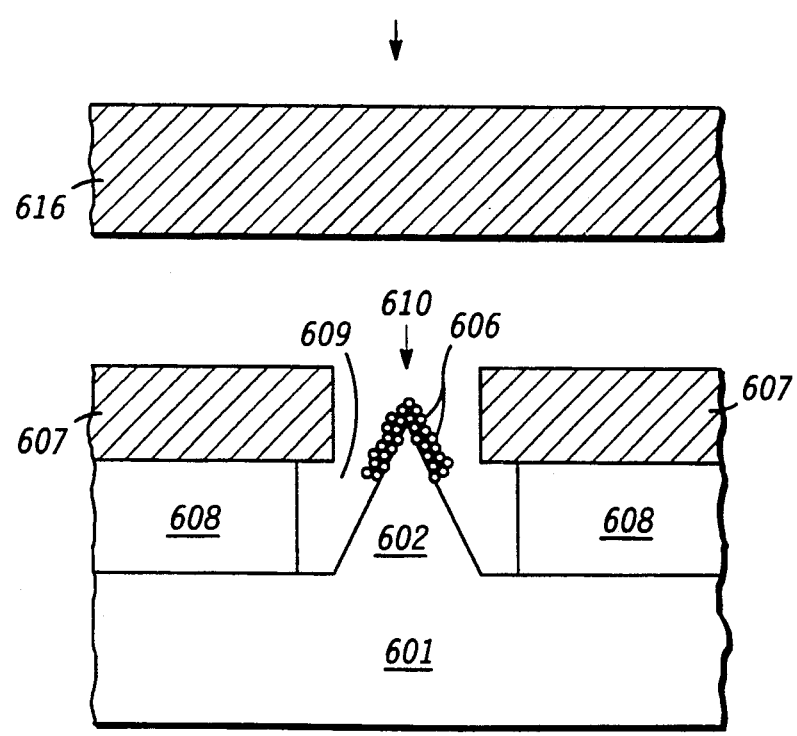

FIG. 6E is a side elevational depiction of structure 600 further comprising an anode 616 distally disposed with respect to electron emitter 610 for collecting electrons which are emitted by electron emitter 610. Conductive/semiconductive layer 607 functions as an emission controlling electrode for controlling the rate of electrode emission. The field emission device employing an electron emitter including a diamond coating, formed in accordance with the method of the present invention described in FIGS. 6A-6E, may be employed advantageously in applications known in the art. Utilizing implanted nucleation sites from which diamond crystallite growth is initiated provides for a more uniform coating. Since coating thicknesses on the order of 10 Å to less than 5000 Å are desirable it is an important feature of coating formation that irregularities in coating thickness and coverage be minimized. Other methods of realizing diamond film growth do not provide for substantially uniform growth thickness and coverage.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What we claim is:

1. A method for forming a field emission electron emitter comprising the steps of:
    providing a selectively shaped conductive/semiconductive electrode having a major surface;
    implanting ions, as nucleation sites, onto at least a part of the major surface of the conductive/semiconductive electrode; and
    growing diamond crystallites preferentially at at least some of the nucleation sites, such that an electron emitter comprising a coating of diamond disposed on at least a part of the major surface of the selectively shaped conductive/semiconductive electrode is formed.

2. The method of claim 1 wherein the step of implanting ions includes implanting carbon ions.

3. The method of claim 1 wherein the step of providing a conductive/semiconductive electrode includes anisotropic etching of semiconductor material.

4. A method for forming a field emission electron emitter comprising the steps of:
    providing a supporting substrate;
    depositing a layer of patternable material on the supporting substrate;
    patterning the layer of patternable material to provide an aperture therethrough;
    providing a selectively shaped conductive/semiconductive electrode disposed substantially within the aperture and on the supporting substrate;
    implanting ions, as nucleation sites, onto at least a part of the conductive/semiconductive electrode;
    removing substantially all of the layer of patternable material; and
    growing diamond crystallites preferentially at at least some of the nucleation sites, such that an electron emitter is formed comprising a coating of diamond disposed on at least a part of the surface of the selectively shaped conductive/semiconductive electrode.

5. The method of claim 4 wherein the step of implanting ions includes implanting carbon ions.

6. The method of claim 4 wherein the step of providing a conductive/semiconductive electrode includes the step of forming the electrode by a substantially normal deposition of conductive/semiconductive material.

7. A method for forming a field emission device comprising the steps of:
    providing a supporting substrate;
    depositing a layer of insulator material on the supporting substrate;
    depositing a conductive/semiconductive layer on the layer of insulator material;
    providing a layer of patternable material disposed on the conductive/semiconductive layer;
    patterning the layer of patternable material to provide a patterned aperture therethrough;
    selectively etching an etched aperture through the conductive/semiconductive layer and the layer of insulator material, which etched aperture substantially conforms to the patterned aperture in the patternable material;
    providing a selectively shaped conductive/semiconductive electrode, having a surface, disposed substantially within the etched aperture and on the supporting substrate;
    removing substantially all of the patternable material;
    implanting ions, as nucleation sites, onto at least a part of the surface of the conductive/semiconductive electrode; and
    growing diamond crystallites preferentially at at least some of the nucleation sites, such that a field emission device is formed having an electron emitter comprising a coating of diamond disposed on at least a part of the surface of the selectively shaped conductive/semiconductive electrode.

8. The method of claim 7 wherein the step of implanting ions includes implanting carbon ions.

9. The method of claim 7 wherein the step of providing a selectively shaped conductive/semiconductive electrode includes forming a conductive/semiconductive electrode by a substantially normal deposition of conductive/semiconductive material.

10. The method of claim 7 wherein the step of implanting ions included the steps of:
    providing ion implantation apparatus;
    disposing the conductive/semiconductive electrode in the ion implantation apparatus and implanting ions, as nucleation sites, onto at least a part of the surface of the conductive/semiconductive electrode;
    providing a first voltage source operably coupled between the supporting substrate and the ion implantation apparatus such that an ion accelerating electric field is provided substantially between the ion implantation apparatus and the conductive/semiconductive electrode; and
    providing a second voltage source operably coupled between the supporting substrate and the conductive/semiconductive layer such that an ion repelling electric field is provided substantially between the conductive/semiconductive layer and the conductive/semiconductive electrode, such that at least some of the ions are preferentially directed to a preferred part of the conductive/semiconductive electrode.

11. The method of claim 7 and further including the steps of:
depositing a layer of material, subsequent to the removal of the patternable material, onto the conductive/semiconductive layer by means of low angle deposition such that the etched aperture is selectively partially closed; and
removing substantially all of the layer of material subsequent to the implantation of the ions, such that carbon ions are substantially selectively implanted onto a preferred part of the surface of the conductive/semiconductive electrode.

12. A method for forming a field emission device comprising the steps of:
providing a supporting substrate;
depositing a layer of insulator material on the supporting substrate;
depositing a conductive/semiconductive layer on the layer of insulator material;
providing a layer of patternable material disposed on the conductive/semiconductive layer;
patterning the layer of patternable material to provide at least one patterned aperture therethrough;
selectively etching an etched aperture through the conductive/semiconductive layer and the layer of insulator material, which etched aperture substantially conforms to the patterned aperture in the patternable material;
providing a selectively shaped conductive/semiconductive electrode, having a surface, disposed substantially within the etched aperture and on the supporting substrate;
implanting ions, as nucleation sites, onto at least a part of the surface of the conductive/semiconductive electrode;
removing substantially all of the layer of patternable material; and
growing diamond crystallites preferentially at at least some of the nucleation sites, such that a field emission device is formed having an electron emitter comprising a coating of diamond disposed on at least a part of the surface of the selectively shaped conductive/semiconductive electrode.

13. The method of claim 12 wherein the step of implanting ions includes implanting carbon ions.

14. The method of claim 12 wherein the step of providing a selectively shaped conductive/semiconductive electrode includes forming the electrode by a substantially normal deposition of conductive/semiconductive material.

15. The method of claim 12 wherein the step of implanting ions included the steps of:
providing ion implantation apparatus;
disposing the conductive/semiconductive electrode in the ion implantation apparatus and implanting ions, as nucleation sites, onto at least a part of the surface of the conductive/semiconductive electrode;
providing a first voltage source operably coupled between the supporting substrate and the ion implantation apparatus such that an ion accelerating electric field is provided substantially between the ion implantation apparatus and the conductive/semiconductive electrode; and
providing a second voltage source operably coupled between the supporting substrate and the conductive/semiconductive layer such that an ion repelling electric field is provided substantially between the conductive/semiconductive layer and the conductive/semiconductive electrode, such that at least some of the ions are preferentially directed to a preferred part of the conductive/semiconductive electrode.

16. The method of claim 12 and further including the steps of:
depositing a layer of material, subsequent to the removal of the patternable material, onto the conductive/semiconductive layer by means of low angle deposition such that the at least one aperture is selectively partially closed; and
removing substantially all of the layer of material subsequent to the implantation of the ions, such that carbon ions are substantially selectively implanted onto a preferred part of the conductive/semiconductive electrode.

* * * * *